(12) United States Patent
Nguyen et al.

(10) Patent No.: US 11,725,753 B2
(45) Date of Patent: Aug. 15, 2023

(54) LINE FEEDTHROUGH

(71) Applicant: Hilti Aktiengesellschaft, Schaan (LI)

(72) Inventors: Huu Toan Nguyen, Eichberg (CH); Christoph Hakenholt, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 17/754,851

(22) PCT Filed: Sep. 30, 2020

(86) PCT No.: PCT/EP2020/077307
§ 371 (c)(1),
(2) Date: Apr. 13, 2022

(87) PCT Pub. No.: WO2021/073870
PCT Pub. Date: Apr. 22, 2021

(65) Prior Publication Data
US 2022/0364660 A1 Nov. 17, 2022

(30) Foreign Application Priority Data

Oct. 15, 2019 (EP) .................................... 19203197

(51) Int. Cl.
*F16L 5/04* (2006.01)
*F16L 5/02* (2006.01)
(Continued)

(52) U.S. Cl.
CPC .................. *F16L 5/04* (2013.01); *F16L 5/025* (2013.01); *F16L 5/10* (2013.01); *H02G 3/0462* (2013.01); *H02G 3/22* (2013.01)

(58) Field of Classification Search
CPC . H02G 3/22; H02G 3/0462; F16L 5/10; F16L 5/025; F16L 5/04
See application file for complete search history.

(56) References Cited

U.S. PATENT DOCUMENTS 4,630,415 A * 12/1986 Attwell ..................... F16L 5/02
52/321
4,983,784 A * 1/1991 Whitlock ............. H02G 3/0641
174/669

(Continued)

FOREIGN PATENT DOCUMENTS

DE 102006035475 6/2008
JP 2000257755 A * 9/2000 ................ F16L 5/10
(Continued)

OTHER PUBLICATIONS

International Search Report dated Dec. 2, 2020 in PCT/EP2020/077307, with English translation, 5 pages.
(Continued)

*Primary Examiner* — Eugene G Byrd
(74) *Attorney, Agent, or Firm* — Grüneberg and Myers, PLLC

(57) ABSTRACT

A line feedthrough for guiding at least one line through a component, contains a cladding tube, at least one element which is mounted within the cladding tube and can rotate relative to the cladding tube, and a sealing element which is in the form of a flexible hose body and arranged within the cladding tube and the element. The hose body is connected, in an axial end region, to the element and can be displaced by rotational movement between a closed position and an open position. A guide element is provided which can be displaced in the longitudinal direction relative to the cladding tube, and which cooperates with a guide track of the element. The guide track of the element is in a spiral shape, such that a displacement of the guide element in the longitudinal direction leads to a rotation of the element relative to the cladding tube.

15 Claims, 5 Drawing Sheets

(51) Int. Cl.
*F16L 5/10* (2006.01)
*H02G 3/04* (2006.01)
*H02G 3/22* (2006.01)

(56) References Cited

U.S. PATENT DOCUMENTS

| | | | | |
|---|---|---|---|---|
| 5,456,050 | A * | 10/1995 | Ward | H02G 3/0412 52/220.8 |
| 6,840,483 | B1 * | 1/2005 | Dickens | F16L 5/10 411/405 |
| 7,642,461 | B2 * | 1/2010 | Klein | F16L 5/10 174/93 |
| 9,383,043 | B2 * | 7/2016 | Klein | F16L 5/04 |
| 10,082,450 | B2 * | 9/2018 | Ackerman | G01S 1/68 |
| 10,400,172 | B2 * | 9/2019 | Muenzenberger | C09J 9/00 |
| 2004/0016190 | A1 * | 1/2004 | Radke | F16L 5/04 52/220.8 |
| 2006/0006611 | A1 * | 1/2006 | Foerg | F16L 5/02 277/602 |
| 2007/0125018 | A1 * | 6/2007 | Stahl | F16L 5/04 52/232 |
| 2008/0128998 | A1 | 6/2008 | Klein et al. | |
| 2011/0272890 | A1 * | 11/2011 | Selby | F16L 5/04 277/345 |
| 2012/0007315 | A1 * | 1/2012 | Worley | F16L 5/10 277/314 |
| 2012/0233943 | A1 * | 9/2012 | Monden | F16L 5/04 52/220.1 |
| 2017/0152975 | A1 * | 6/2017 | Huang | F16L 27/0816 |
| 2018/0266589 | A1 * | 9/2018 | Stroike | H02G 15/013 |
| 2021/0113872 | A1 * | 4/2021 | Jung | A62C 35/68 |

FOREIGN PATENT DOCUMENTS

| | | | | |
|---|---|---|---|---|
| JP | 2009243612 | A | * | 10/2009 |
| JP | 2013147840 | A | * | 8/2013 |
| JP | 2017153364 | A | * | 8/2017 |
| JP | 2021078583 | A | * | 5/2021 |
| JP | 2021081063 | A | * | 5/2021 |

OTHER PUBLICATIONS

Written Opinion dated Dec. 2, 2020 in PCT/EP2020/077307, with English translation, 9 pages.

* cited by examiner

LINE FEEDTHROUGH

CROSS-REFERENCE TO RELATED APPLICATIONS

This application s the National Stage entry under § 371 of International Application No. PCT/EP2020/077307, filed on Sep. 30, 2020, and which claims the benefit of priority to European Application No. 19203197.9, filed on Oct. 15, 2019. The content of each of these applications is hereby incorporated by reference in its entirety.

BACKGROUND OF THE INVENTION

Field of the Invention

The invention relates to a line feedthrough for guiding at least one line through a component, comprising a cladding tube, an element which is mounted within the cladding tube and can rotate relative to the cladding tube, and comprising a sealing element which is in the form of a flexible hose body and arranged within the cladding tube and the element, according to the type described in greater detail further below.

Description of Related Art

Line feedthroughs of this kind are used to guide lines such as pipelines, cables or cable ducts through components such as ceilings or walls, and are built into a component such as a wall or ceiling when or after said component is created. In particular, the line feedthroughs can be cast in concrete ceilings or walls or feedthroughs can later be drilled, sawn or cut into the component. Line feedthroughs of this kind are preferably provided with a fire protection function. Fire protection is therefore already in place, from the time of installation or casting into the component to the installation of the line through the line feedthrough through to the completion of the building. An important factor in line feedthroughs of this kind is their internal tightness against gaseous media such as flue gas.

DE 10 2006 035 475 A1 discloses a line feedthrough which can be introduced into a component such as a concrete wall. The line feedthrough comprises a cladding tube consisting of two parts, and a hose body that can be rotated along its longitudinal axis, at the first and second axial hose ends of which body a first and a second ring part, respectively, are arranged, which ring parts act as support elements for the hose body. The two axial hose ends of the hose body can be rotated relative to one another by a total of at least 45°, preferably at least 90', such that a passage through the hose body can be closed or an inner diameter of the hose body can be reduced substantially to zero.

Transferring the hose body from a closed position, in which the passage through the hose body is closed, into an open position, in which a passage through the hose body is at least partially unblocked for the arrangement of lines and cables, is disadvantageously complex.

SUMMARY OF THE INVENTION

The problem addressed by the present invention is therefore that of providing a line feedthrough for guiding lines through components, wherein the line feedthrough can be displaced between a closed position and an open position in a user-friendly manner.

Therefore, a line feedthrough for guiding at least one line through a component is proposed, the line feedthrough comprising a cladding tube, an element which is mounted within the cladding tube and can rotate relative to the cladding tube, and comprising a sealing element which is in the form of a flexible hose body and arranged within the cladding tube and the element, the hose body being connected, in an axial end region, to the element, and it being possible to displace said hose body by means of a rotational movement between a closed position, in which the hose body at least partially closes a passage through the hose body, and an open position, in which a passage through the hose body is at least partially unblocked.

According to the invention, it is proposed that a guide element is provided which can be displaced in the longitudinal direction relative to the cladding tube and which interacts with a guide track of the element, the guide track of the first element being in a spiral shape such that a displacement of the guide element in the longitudinal direction leads to a rotation of the first element relative to the cladding tube.

The solution according to the invention provides a structurally simple line feedthrough which can be easily displaced between the closed position and the open position in a guided manner. In this case, a translational movement of the guide element is converted into a rotational movement of the hose body that is to be achieved.

The cladding tube can, for example, have a circular, elliptical, square, rectangular, triangular, polygonal or similar cross section.

In an embodiment according to the invention that is structurally simple to implement, the guide track is formed by at least one guide rail with which at least one recess of the guide element engages. The guide element preferably engages with a guide track of the element by means of a plurality, in particular two, recesses. This creates better guidance.

When a spring device is provided which cooperates with the guide element and which acts on the guide element with a force such that the guide element moves the element toward an end position in which the hose body assumes its closed position, it is possible to easily ensure that the line feedthrough, in a basic state, assumes the closed position without manual actuation, Irrespective of the number and size of lines guided through the hose body, this ensures that the line feedthrough assumes its closed position in the basic state, Gas is reliably prevented from passing through the line feedthrough regardless of the number and size of the lines that are guided through the line feedthrough and arranged within the hose body. After being actuated by a user, the hose body is reliably transferred into the closed position as a result of the provision of the spring device, and therefore user errors can be reliably prevented.

In a structurally simple embodiment of the line feedthrough, the spring device can be designed as a tension spring, which preferably interacts with the element and with the guide element. Alternatively or in addition thereto, the spring device can be designed as a spiral spring or torsion spring. By providing a spiral spring or torsion spring which can be arranged outside or inside the cladding tube, it is possible to achieve favorable application of force, and it can be easily ensured that the line feedthrough can be reliably transferred into the closed position without being actuated by a user and/or as a result of application of force from a user, by providing the torsion spring with an appropriate spring rate.

In order to be able to particularly reliably transfer the hose body into its closed position, a device can be provided in a preferably central region of the hose body in the longitudinal direction of the hose body, which device preloads the hose body toward its closed position. In particular, the preferably resilient device completely surrounds the hose body and transfers it into its closed position in the unloaded state. However, the hose body can be moved into its open position, counter to a force acting on the hose body from the device, by means of the application of an external force.

In a structurally simple embodiment of the invention, the device is in the form of a spring device, an elastic band, a rubber band or the like.

In order to be able to monitor the state of the line feedthrough in a simple manner, a sensor device can be provided by means of which in particular the closed position and/or the open position of the hose body can be determined. By means of the sensor device, it is possible to reliably determine the state of the hose body, even without visual verification, by means of using appropriate, in particular wireless means.

In an advantageous embodiment, the sensor device is designed as a contact sensor, in particular as an RFID sensor, or as a contactless sensor, it being possible, in principle, to use a wide variety of sensors.

In one advantageous embodiment of the line feedthrough according to the invention, a displacement device is provided by means of which the guide element can be displaced in the longitudinal direction of the line feedthrough and the hose body can be displaced between its closed position and its open position. In this way, a displacement of the hose body that can be carried out easily by a user can also be implemented, for example, counter to a spring force of a spring device, from the closed position into the open position.

The line feedthrough can be particularly easily transferred between the closed position and the open position when the displacement device has a lever element which can be pivoted relative to the cladding tube.

In a particularly user-friendly embodiment of the invention, a locking device is provided by means of which the lever element can be fixed in at least one end position and in particular in both end positions with respect to the cladding tube. As a result, in particular in the case of a line feedthrough comprising a spring device, the locking device makes it possible to work with two hands to guide through lines and cables when in the open position.

In an advantageous embodiment of the line feedthrough, a further guide element is provided which can be displaced in the longitudinal direction relative to the cladding tube and which interacts with a further guide track of a further element, the further guide track of the further element being in a spiral shape such that a displacement of the further guide element in the longitudinal direction leads to a rotation of the further element. The further element, the further guide element and the further guide track are in this case designed in particular to be comparable to the element, the guide element and the guide track, with the element and the further element preferably being mounted in the cladding tube so as to be able to rotate relative to the cladding tube independently of one another. The hose body is preferably non-rotatably connected to the further element in a further end region remote from the element. As a result of this design, the hose body, when mounted, can be displaced from both sides or end regions between the closed position and the open position, and lines can be guided through the line feedthrough. This is particularly advantageous when the line feedthrough is mounted in a wall.

The hose body is preferably very thin and in particular has a material thickness of from 0.01 mm to 2 mm. The hose body can have a narrow portion in its central region. This limits the maximum possible opening cross section such that, when the line feedthrough is not occupied by a line, the open cross section in the open state is not undesirably large.

The hose body is preferably made of a gas-tight material, such as a woven fabric, rubber, film material or the like, which is simultaneously resilient.

In an advantageous embodiment of the line feedthrough, a resilient material such as a foam or rubber material is arranged on the inside of the tube body. In so doing, the tightness between a line guided through the hose body and the hose body can be further improved.

In an advantageous embodiment of a line feedthrough according to the invention, a sealing means is provided. The sealing means can, for example, be designed as a ring made of intumescent material, and ensures the fire protection of the line feedthrough. The sealing means can, for example, be connected to the cladding tube or the element.

Further advantages can be found in the following description of the drawings. Embodiments of the present invention are shown in the drawings. The drawings and the description contain numerous features in combination. A person skilled in the art will expediently also con-sides the features individually and combine them to form meaningful further combinations.

In the drawings, identical and equivalent components are provided with the same reference signs.

In the drawings:

DETAILED DESCRIPTION OF THE INVENTION

Figure 1:
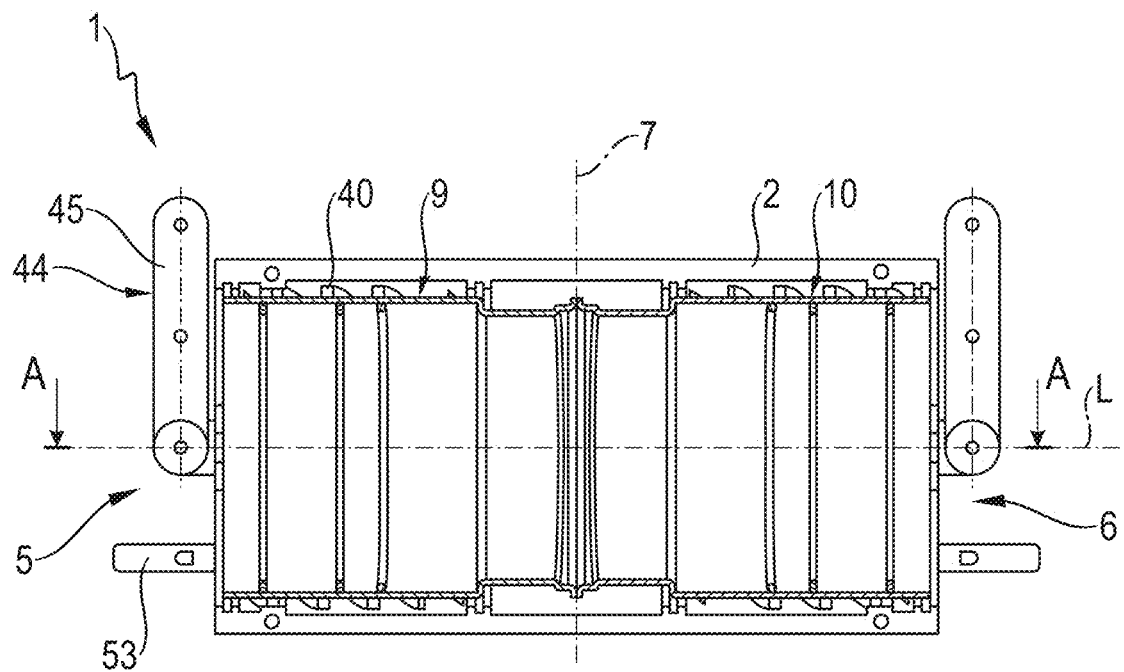
FIG. 1 shows a sectional view of a line feedthrough comprising a cladding tube and two elements arranged in the cladding tube, the elements each being arranged in a closed position.

FIG. 1 to FIG. 6 show an embodiment of a line feedthrough 1 comprising a dimensionally stable cladding tube 2. The line feedthrough 1 can be subsequently introduced into an opening in a component, for example a concrete wall, or it can be incorporated into the component when said component is created.

In the present case; the line feedthrough 1 is substantially symmetrical with respect to a central transverse plane 7 which is arranged perpendicular to a longitudinal axis L of the line feedthrough 1, with two end regions 5, 6 of the line feedthrough 1 being substantially comparable to one another in the longitudinal direction L. The first end region 5 is described in the following as being representative of the second end region 6.

The line feedthrough 1 also has a sealing element 3 which extends in the longitudinal direction L and which is designed in this case as a flexible hose body that can be rotated about the longitudinal axis L as the axis of rotation or as a hose element. The hose element is non-rotatably connected, in each of its end regions, to an element 9 or 10, which elements are in this case each sleeve-shaped, each mounted in the cladding tube 2 in a separately rotatable and axially fixed manner, and rotatable relative to one another.

The hose element in this case consists, for example, of a flexible and/or resilient, thin-walled and gas-tight rubber; woven fabric or film material and is provided on the inside with a resilient material such as a foam or rubber material. In this case; thin-walled is understood to mean that the wall thickness of the material in the present case is approximately 0.01 mm to approximately 2 mm. The resilient material can be arranged on the inside of the hose element, for example in the form of a continuous coating, or only in regions, for example in the form of strips or ribs arranged in the longitudinal direction of the hose element. The hose element can have a narrow portion which, when the hose element is installed in the cladding tube 2 of the line feedthrough 1, has an inner diameter that is smaller than a maximum diameter of the hose element, in particular in the region of the connection to the elements 9 and 10. The inner diameter of the hose element describes an average opening width of the hose element, such that hose elements having an oval or polygonal cross section, i.e. a non-circular cross section, also have an inner diameter according to this definition. The two axial hose ends of the hose element or hose body can be rotated relative to one another in the present case by a total of at least 45°, preferably at least 90°, it being possible to displace the hose element between a closed position, in which the inner diameter of the hose element is reduced substantially to zero, and an open position, in which a passage through the hose element is unblocked for the arrangement of cables and lines.

The end regions of the hose element are preferably connected, around the entire circumference thereof, to the element 9 or the further element 10, with the elements 9, 10 in the present case circumferentially surrounding the end regions of the hose element.

On its outwardly facing side, the element 9 has at least one, preferably two guide tracks in the form of guide rails 40, which in this case extend substantially in a spiral shape from one end region of the element 9 to a second end region of the element 9. A guide element 41 is also provided, which is mounted in a guide rail 42 of the cladding tube 2 in a translational manner and in this case interacts with two guide rails 40 of the element 9 by means of two recesses 47.

Figure 2:
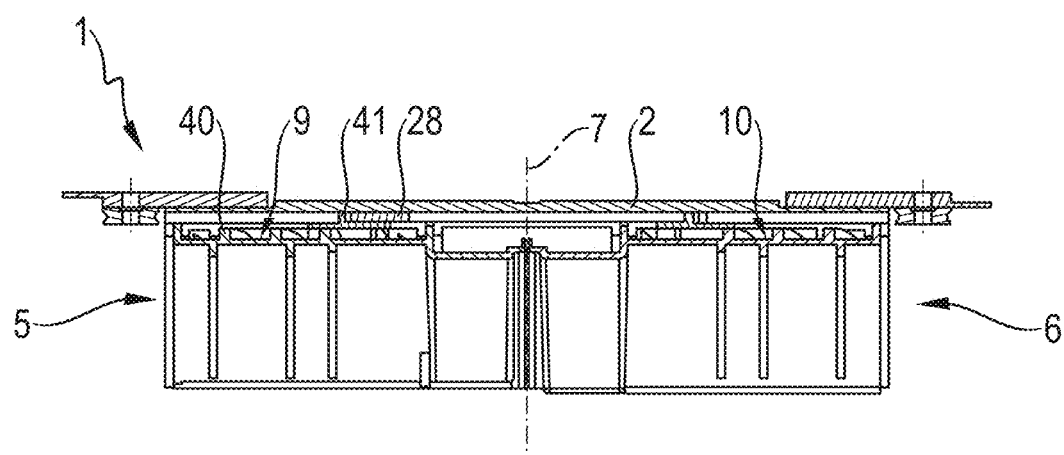
FIG. 2 shows a longitudinal sectional view of the line feedthrough according to FIG. 1, where a guide element can be seen which can be translationally displaced relative to the cladding tube in a guide rail of the cladding tube and which is engaged with a guide rail of the element.
Figure 3:
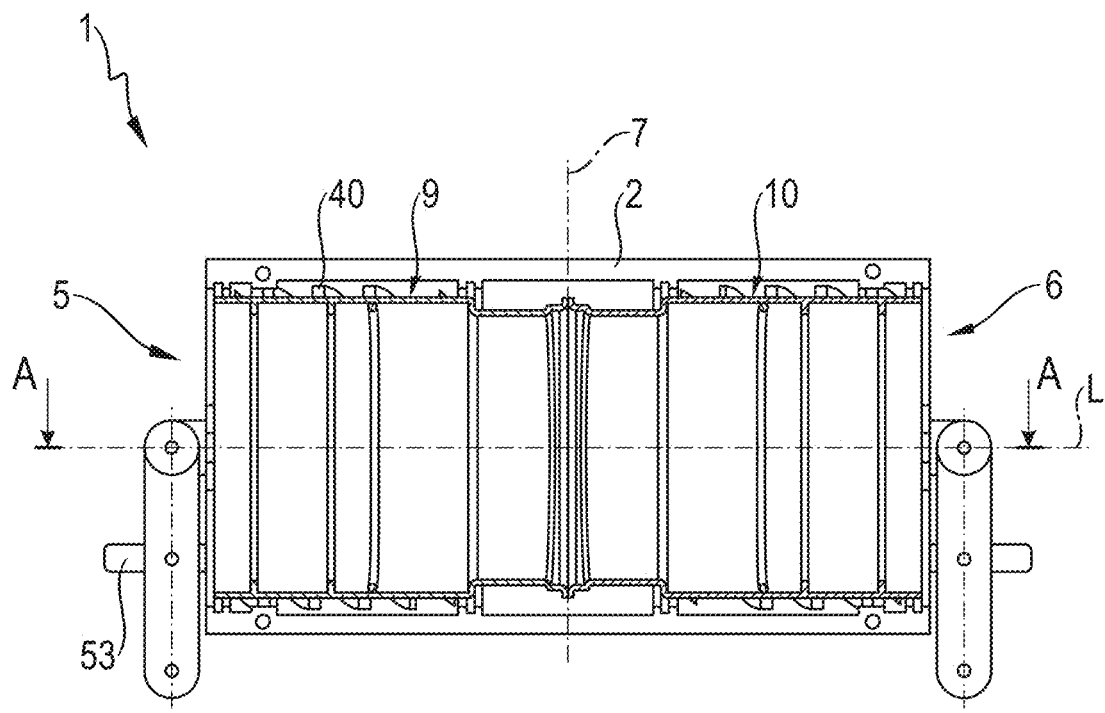
FIG. 3 shows a view of the line feedthrough that corresponds to FIG. 1, with the line feedthrough in an open position.
Figure 4:
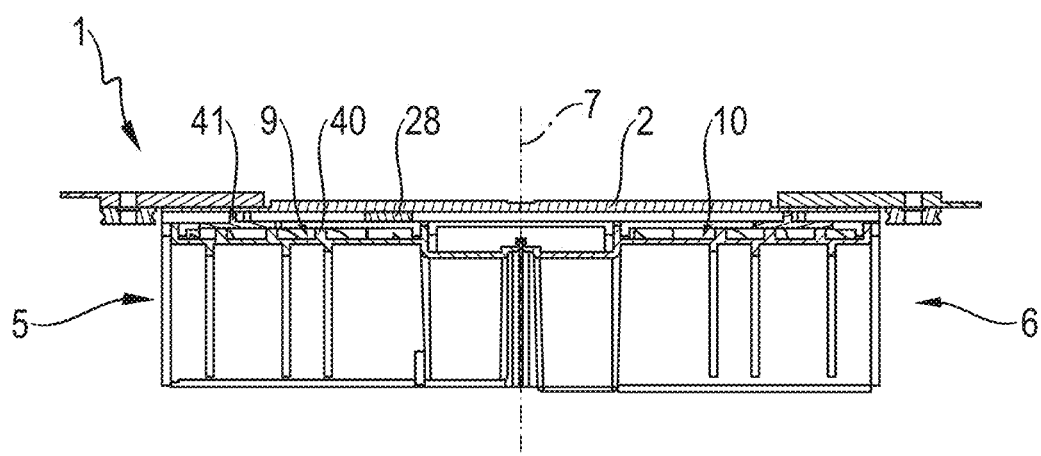
FIG. 4 shows a longitudinal sectional view of the line feedthrough in the open position that corresponds to FIG. 2.

A displacement device 44 comprising a lever element 45 is also provided, the lever element 45 being designed to displace the guide element 41 in the guide rail 42 in a translational manner. In FIG. 1 and FIG. 2, the lever element 45 is arranged in a first end position in which the guide element 41 is in a first end position of the guide rails 40. This position corresponds to the closed position of the hose element. FIG. 3 and FIG. 4 show the lever element 45 in a second end position pivoted in the present case by approximately 180° relative to the first end position, in which second end position the guide element 41 is displaced in the guide rail 42 into a second end position. In the present case, a locking device 53 is provided, which is provided for fixing the lever element 45 in its second end position. This reliably prevents the lever element 45 from undesirably moving back into its first end position even if a user has not actuated the lever element 45.

When the guide element 41 is transferred between the first end position and the second end position, the interaction of the guide element 41 with the guide rails 40 rotates the element 9 about the longitudinal axis L, the hose element thus being displaced from its closed position into its open position.

Figure 5:
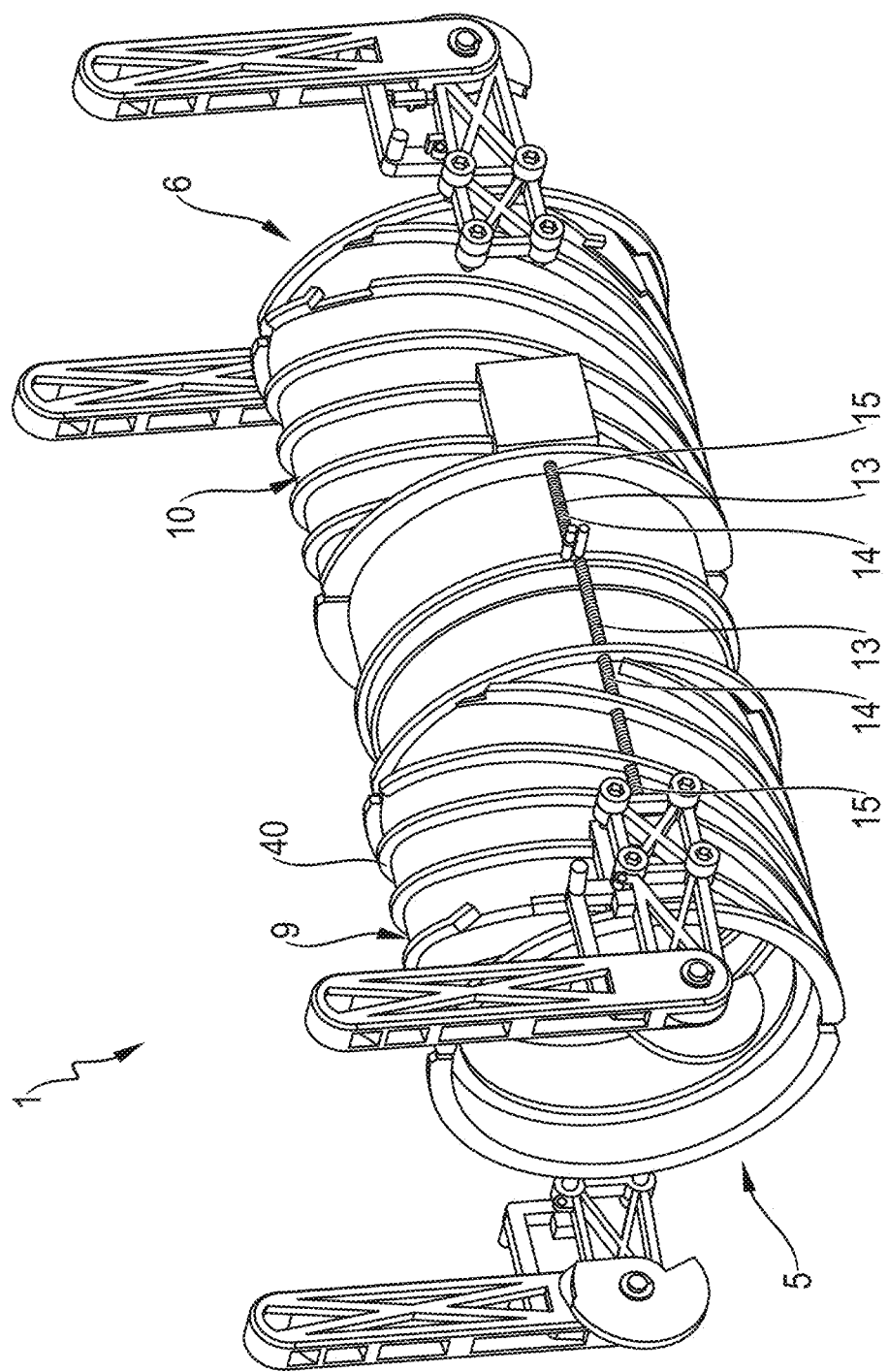
FIG. 5 shows a three-dimensional view of the line feedthrough without the cladding tube and the hose body.
Figure 6:
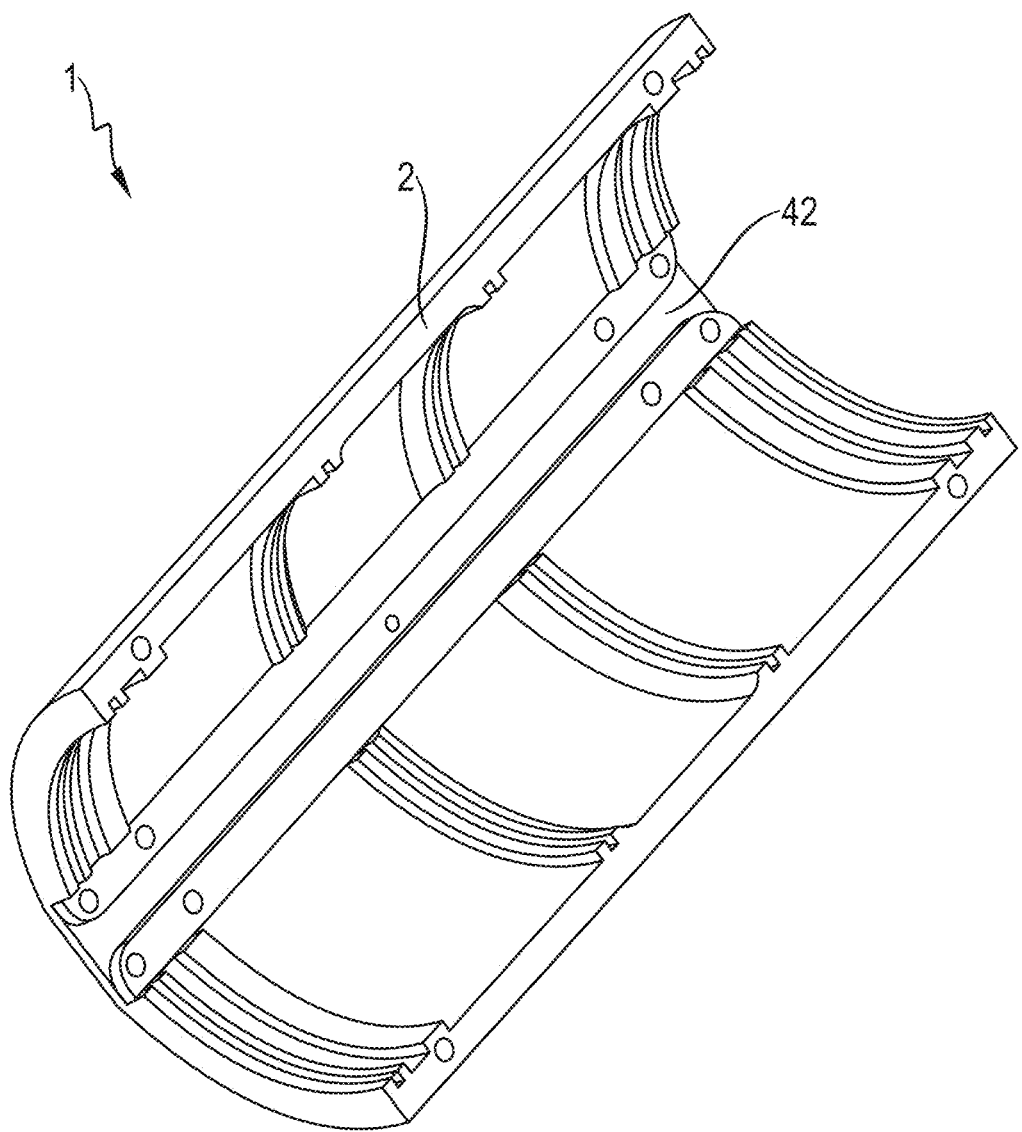
FIG. 6 shows a three-dimensional view of half of the cladding tube of the line feedthrough according to FIG. 1 in isolation.

As can be seen in greater detail in FIG. 5, in the present case a spring device 13 in the form of a tension spring is provided, which in a first end region 14 is connected to an end region of the element 9 near the central transverse plane 7, and in a second end region 15 remote from the first end region 14 is connected to the guide element 41. The tension spring 13 acts on the guide element 41 with a force which loads the guide element 41 toward its position (shown in FIG. 1 and FIG. 2) that corresponds to a closed position of the line feedthrough 1.

In order to be able to particularly reliably ensure, in the closed position, that the passage through the hose element is preferably completely closed, a preferably resilient device can, for example, completely circumferentially encompass the hose element in a region preferably near the central transverse plane 7 or in the region of the central transverse plane 7, with the device acting on the hose body with a force that presses the hose body into its closed position. The device can, for example, be in the form of a spring device, elastic band or rubber band.

In order to be able to determine the state of the line feedthrough 1, i.e. whether the hose element is in the closed position, and in particular to also be able to determine this from a location remote from the line feedthrough 1, a sensor device 28 (shown here only schematically) can be provided. The sensor device 28 is designed in this case as a contact sensor in the form of an RFID sensor, with signals from the sensor device 28 being transmitted by wire or preferably wirelessly to an external device, such as a mobile phone or a server, so that the state of the line feedthrough 1 can be monitored therefrom.

The line feedthrough 1 can also comprise a sealing means (not shown in greater detail here) which can be connected, for example, to the cladding tube 2 or the element 9. The sealing means 19 is, for example, a ring made of an intumescent material, and ensures the fire protection of the line feedthrough 1.

As a result of the symmetrical design of the line feedthrough 1, the hose element can advantageously be transferred, from both end regions 5, 6, from the closed position into the open position and vice versa. This is particularly advantageous when the line feedthrough 1 is in a mounted state.

Figure 7:
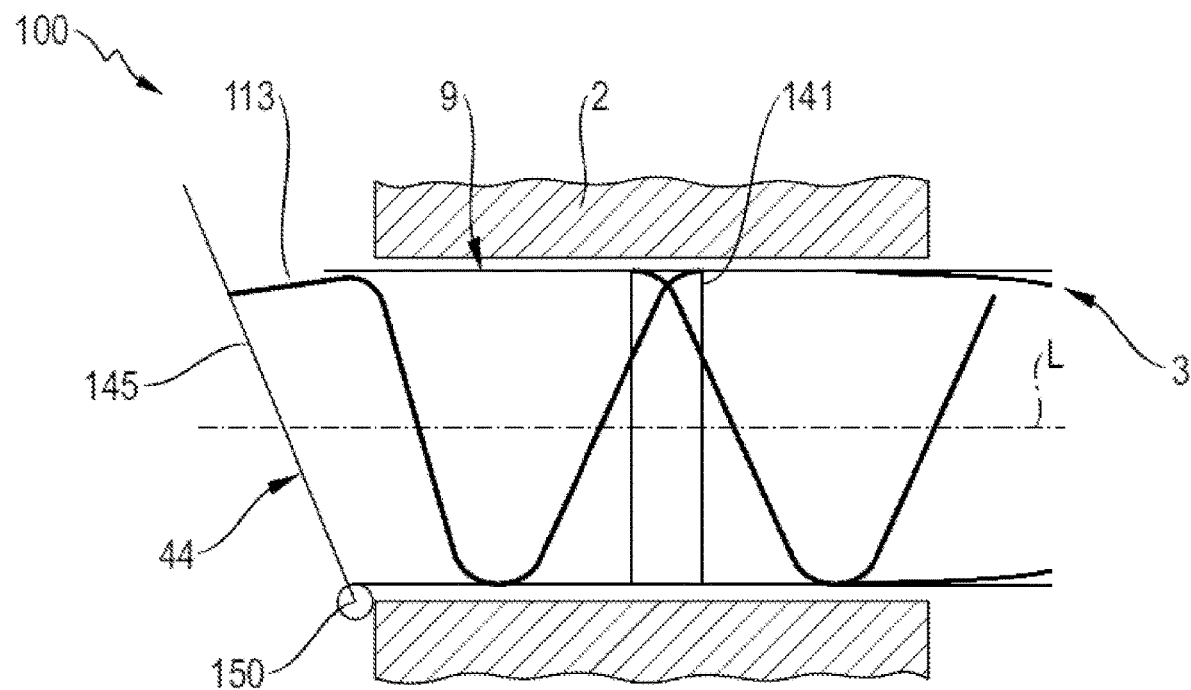
FIG. 7 shows a simplified longitudinal sectional view of an alternatively designed line feedthrough.
Figure 8:
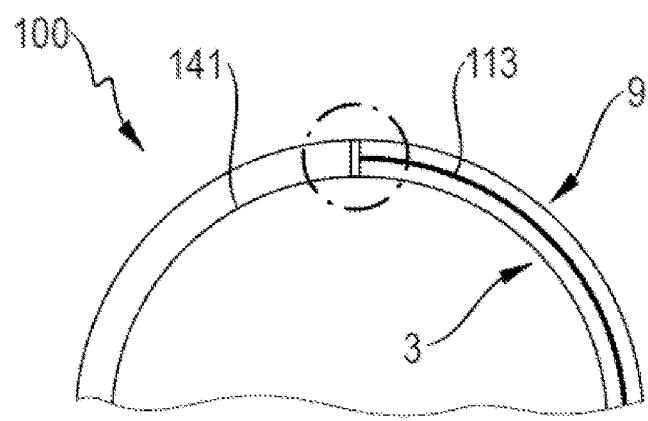
FIG. 8 shows a simplified cross-sectional view of the line feedthrough according to FIG. 7.

FIG. 7 and FIG. 8 show a further embodiment of a line feedthrough 100 according to the invention. In the following, only the differences between the line feedthrough 100 and the line feedthrough 1 are discussed, and otherwise reference is made to the comments with regard to the line feedthrough 1.

Instead of the spring device 13 in the form of a tension spring, the line feedthrough 100 comprises a spring device 113 in the form of a torsion spring. The torsion spring 113 is arranged in particular in the region of grooves arranged in a spiral shape in the cladding tube 2. The torsion spring 113 is connected in a first end region to the guide element 41 and in a remote second end region to a lever element 145 of the displacement device 44.

In the present case, the lever element 145 is connected to the cladding tube 2 in a revolute joint 150. By displacing the lever element 145 around the revolute joint 150, the guide element 41 can be displaced in the guide rail 145 in the manner described in greater detail above.

The spring rate of the torsion spring 113 is selected in particular such that the line feedthrough 100 can be reliably transferred into the closed position by means of an external application of force to the lever element 145.

In this case, the torsion spring 113 is designed in particular as a wire, for example a metal wire or Teflon wire.

The invention claimed is:

1. A line feedthrough for guiding at least one line through a component, comprising:
   a cladding tube,
   at least one element which is mounted within the cladding tube and can rotate relative to the cladding tube,
   a guide element,
   a displacement device which can displace the guide element in a longitudinal direction (L), and
   a sealing element which is in the form of a flexible hose body and arranged within the cladding tube and the at least one element,
   wherein the hose body is connected, in an axial end region, to the at least one element and wherein the hose body is configured to be displaced by a rotational movement between a closed position, in which the hose body at least partially closes a passage through the hose body, and an open position, in which a passage through the hose body is at least partially unblocked, and
   Wherein the guide element can be displaced in the longitudinal direction L) relative to the cladding tube and which cooperates with a guide track of the at least one element, wherein the guide track of the at least one element is in a spiral shape such that a displacement of the guide element in the longitudinal direction (L) leads to a rotation of the at least one element relative to the cladding tube.

2. The line feedthrough according to claim 1, wherein the guide track is formed by at least one guide rail with which at least one recess of the guide element engages.

3. The line feedthrough according to claim 1, wherein a spring device is provided which cooperates with the guide element and which acts on the guide element with a force such that the guide element moves the at least one element toward an end position in which the hose body assumes the closed position.

4. The line feedthrough according to claim 3, wherein the spring device is designed as a tension spring or as a torsion spring.

5. The line feedthrough according to claim 1, wherein the line feedthrough further comprises a device which interacts directly with the hose body, wherein the device preloads the hose body toward the closed position.

6. The line feedthrough according to claim 5, wherein the device is in the form of a spring device, elastic band or rubber band.

7. The line feedthrough according to claim 1, wherein the line feedthrough further comprises a sensor device which can determine at least the closed position of the hose body.

8. The line feedthrough according to claim 7, wherein the sensor device is designed as a contact sensor or as a contactless sensor.

9. The line feedthrough according to claim 1, wherein the displacement device has a lever element which can be pivoted relative to the cladding tube.

10. The line feedthrough according to claim 9, wherein the feedthrough further comprises a locking device which can fix the lever element in at least one end position with respect to the cladding tube.

11. The line feedthrough according to claim 1, wherein the line feedthrough comprises a further guide element which can be displaced in the longitudinal direction (L) relative to the cladding tube and which interacts with a further guide track of a further element, the further guide track of the further element being in a spiral shape such that a displacement of the further guide element in the longitudinal direction (L) leads to a rotation of the further element relative to the cladding tube.

12. The line feedthrough according to claim 1, wherein the hose body is made of a gas-tight material.

13. The line feedthrough according to claim 1, wherein a resilient material is arranged on the inside f the hose body.

14. The line feedthrough according to claim 1, wherein the line feedthrough further comprises a sealing means.

15. The line feedthrough according to claim 8, wherein the sensor device is an RFID sensor.

* * * * *